United States Patent [19]

Skinner et al.

[11] Patent Number: 4,849,273
[45] Date of Patent: Jul. 18, 1989

[54] WELDING BLANKET

[75] Inventors: Mark C. Skinner, Afton, Minn.; Thomas W. Schwartz, Hudson, Wis.

[73] Assignee: Minnesota Mining and Manufacturing Company, Saint Paul, Minn.

[21] Appl. No.: 42,290

[22] Filed: Apr. 24, 1987

[51] Int. Cl.⁴ .............................................. B32B 3/06
[52] U.S. Cl. ................................. 428/102; 428/920; 428/921
[58] Field of Search .............. 428/102, 74, 76, 920, 428/921, 71

[56] References Cited

U.S. PATENT DOCUMENTS 3,162,566 12/1964 Katz ...................................... 428/74
3,916,057 10/1975 Hatch ................................. 428/236
4,467,577 8/1984 Licht .............................. 428/921 X

FOREIGN PATENT DOCUMENTS 472156 3/1951 Canada ................................ 428/74

Primary Examiner—Alexander S. Thomas
Attorney, Agent, or Firm—Donald M. Sell; Walter N. Kirn; William L. Huebsch

[57] ABSTRACT

A welding blanket comprising a layer of flexible protective material comprising unexpanded vermiculite and inorganic heat resistant fibrous material, which layer undergoes localized expansion in a direction normal to its major surfaces when contacted by spatter of molten metal during a welding process; and two relatively thin flexible cover sheets, one attached along each of the major surfaces of the layer of flexible material to maintain its structural integrity.

7 Claims, 1 Drawing Sheet

WELDING BLANKET

TECHNICAL FIELD

The present invention relates to protective coverings called welding blankets that are used to protect surrounding structures from spatter of molten metal during a welding process.

BACKGROUND ART

The welding process typically produces splatter of molten metal. The arc welding process most commonly used in automotive body shops, known as Metal Inert Gas (MIG) or wire welding, produces spatter globules that have a temperature of about 2500 to 3000 degrees Centigrade when they are thrown from the arc, and though they cool quickly, typically are at a temperature in excess of 1800 degrees Centigrade when they contact an adjacent surface so that they can do substantial damage to the upholstery, rugs, vinyl tops, glass or paint of an automobile. Thus, typically protective coverings called welding blankets are spread over surrounding surfaces during welding.

Such known welding blankets have been made of various materials including vinyl, silica, glass fibers, Nomex/Kevlar woven fabric or "aramid fiber". All such known welding blankets, however, have been both very expensive (e.g., cost from $20 to $40 per square yard), and while providing adequate protection for a surface they cover from spatter globules from wire welding, have allowed such spatter globules to burn into and become embedded in them when the spatter globules cool. Such solidified spatter embedded in the blanket acts as an abrasive at the surface of the blanket which can damage surfaces over which the blanket is spread, and since the blankets are expensive, there is a tendency to use the blankets long after they are more dirty and laden with solidified spatter than would be acceptable to the user if such blankets were of lesser cost.

Welding blankets are also commonly used in many other welding operations to protect surfaces from the spatter of molten metal associated with the welding process. One test for the effectiveness of welding blankets set forth by the U.S. Government calls for cutting transversely through a bar of steel having a ¾ inch by 6 inch rectangular cross section in 50 seconds with the bar positioned 16 inches above a welding blanket being tested so that the molten metal produced by the cutting process falls into the blanket. To pass this test the welding blanket must not be burned through by the molten metal. Currently available welding blankets that can pass this test are more expensive than may be desired for many applications.

DISCLOSURE OF INVENTION

The present invention provides a welding blanket structure that can be made to protect an adjacent surface from spatter globules from wire welding while not allowing spatter globules that strike it to burn into it, and can be made to pass the U.S. Government test specification described above, while being relatively inexpensive compared to known welding blankets having similar protective qualities so that it can be more economically replaced when it becomes dirty or damaged from use.

According to the present invention there is provided a welding blanket comprising a layer of flexible protective material having opposite major surfaces and comprising unexpanded vermiculite and inorganic heat resistant fibrous material, which layer of protective material undergoes localized expansion in a direction normal to its surfaces when contacted by spatter of molten metal during a welding process; and two relatively thin flexible cover sheets, one attached along each of its major surfaces.

When the welding blanket according to the present invention is contacted by spatter of molten metal, the contacted cover sheet will normally burn through beneath the spatter, however the localized expansion of the vermiculite in the layer of protective material beneath the spatter apparently will prevent the spatter from burning into that layer, so that the spatter globules will fall off or can be easily brushed off of the blanket.

Preferably the layer of flexible protective material is made generally in accordance with the teachings of U.S. Pat. No. 3,916,057, the content whereof is incorporated herein by reference.

The layer of flexible protective material will provide significant protection against damage by weld spatter when it contains 15 percent or less of the unexpanded vermiculite, however the use of such low levels of unexpanded vermiculite requires a high percentage of inorganic heat resistant fibrous material in the layer of protective material which makes the blanket both too bulky and too expensive for many purposes. Also the blanket functions very efficiently to protect a surface and is very inexpensive when the layer of flexible protective material contains over 85 percent unexpanded vermiculite, however the internal strength of such a layer of flexible protective material is very low. Thus the layer of flexible protective material should contain in the range of 30 to 85 percent of the unexpanded vermiculite and preferably should contain in the range of 55 to 60 percent unexpanded vermiculite which provides a highly effective ability of the layer of flexible protective material to expand in response to heat from the spatter of molten metal, while allowing for sufficient inorganic heat resistant fibrous material and binder to provide a layer of flexible protective material with adequate internal strength for use in the blanket.

The inorganic heat resistant fibrous material in the layer of flexible protective material, which typically makes up 10 to 70 percent of that layer, should be of ceramic materials (e.g., Manville Cerafiber sold by Manville Building Materials Corp., Denver, Colo.) when the welding blanket is to be used in severe environments such as that emulated by U.S. Government test specification described above, or may be of less expensive lower melting point fibers such as mineral wool or fiberglass when the welding blanket is for use in less severe environments, such as to protect automobile surfaces during wire welding. Blends of these fibrous materials may also be useful.

The layer of flexible protective material should also contain in the range of 5 to 15 percent of a suitable binder (e.g., an acrylic binder such as Rhoplex HA-8 emulsion sold by Rohm and Haas Co., Philadelphia, Pa. or Hycar Nitrile Latex 1562X102 sold by B. F. Goodrich Co., Cleveland, Ohio) which binder at over about 15 percent may add significantly to the combustibility of that layer, and at under about 5 percent may not provide adequate internal strength for that layer.

The thickness of the layer of flexible protective material can be varied to suit the environment in which the welding blanket is to be used, with thicknesses over about 0.10 centimeter (0.040 inch) being serviceable.

The cover sheets used on welding blankets used to protect automobile surfaces from wire welding should not promote combustion, but may themselves be combustible so long as they do not burn beyond the area struck by welding spatter, since their function is not to resist the spatter of molten metal which typically burns through them, but only to help contain the relatively friable layer of flexible protective material. Suitable cover sheets for such welding blankets may be made of, for example, nonwoven or woven sheets or films of vinyl, neoprene, polyester, nylon, polypropylene, or polyethylene; the only material that has been found not to be acceptable being non treated cotton which will burn beyond the area contacted by welding spatter. It is believed that vermiculite expanded within the layer of flexible protective material by the contact of welding spatter gives off cooling water vapor that helps to restrict burning of the cover sheets beyond the area contacted by the welding spatter. The cover sheets on welding blankets to be used in severe environments, such as in environments of the type emulated by the U.S. test specification described above, should have cover sheets of non combustible material such as glass or ceramic fibers.

The cover sheets may be attached to the layer of flexible protective material by any of several means including by an adhesive, stitch bonding, or other forms of sewing, and may be bound together around the edges of the welding blanket by means such as sewing.

BRIEF DESCRIPTION OF DRAWING

The present invention will be further described with reference to the accompanying drawing wherein like numbers refer to like parts in the several views, and wherein.

DETAILED DESCRIPTION

Figure 1:
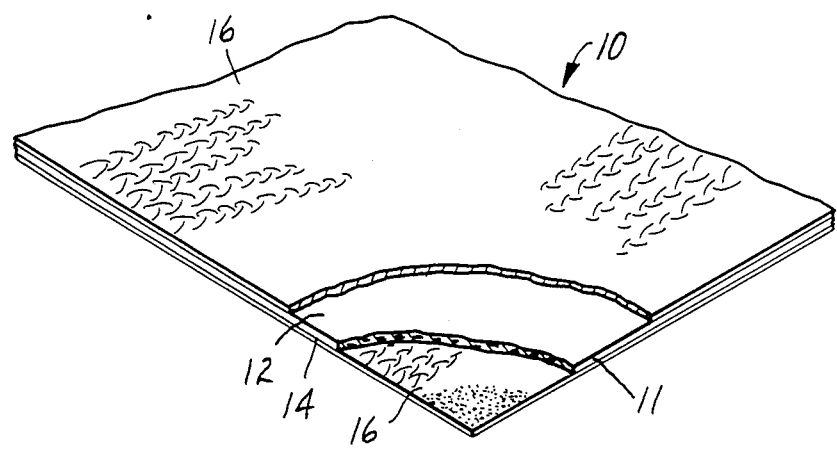
FIG. 1 is a fragmentary perspective view of a welding blanket according to the present invention having parts broken away to show details.

Referring now to FIG. 1 of the drawing, there is shown a welding blanket according to the present invention generally designated by the reference numeral 10.

Generally the welding blanket 10 comprises a layer of flexible protective material 11 having opposite major surfaces 12 and 14 and comprising unexpanded vermiculite and inorganic heat resistant fibrous material, which layer 11 undergoes localized expansion in a direction normal to the surfaces 12 and 14 when contacted by spatter of molten metal during a welding process; and two relatively thin flexible cover sheets 16, one attached along each of the major surfaces 12 and 14 by a suitable adhesive.

Figure 2:
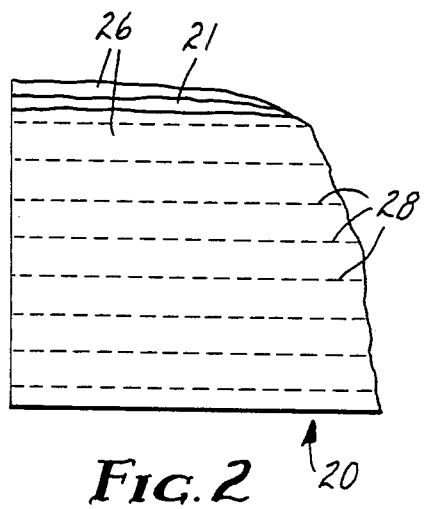
FIGS. 2 and 3 are enlarged fragmentary views having parts broken away to show details which show different alternate embodiments of a welding blanket according to the present invention.

FIG. 2 illustrates an alternate second embodiment of a welding blanket according to the present invention generally designated by the reference numeral 20. Like the welding blanket 10 of FIG. 1, the welding blanket 20 comprises a layer of flexible protective material 21 having opposite major surfaces and comprising unexpanded vermiculite and inorganic heat resistant fibrous material, which layer 21 undergoes localized expansion in a direction normal to its major surfaces when contacted by spatter of molten metal during a welding process; and two relatively thin flexible cover sheets 26, one attached along each of the major surfaces of the layer of flexible protective material 21. Unlike the welding blanket 10, however, the cover sheets 26 are attached to the layer of flexible protective material 21 by sewing to provide parallel rows of stitches 28 through the cover sheets 26 and layer 21 of flexible protective material to hold them together.

Figure 3:
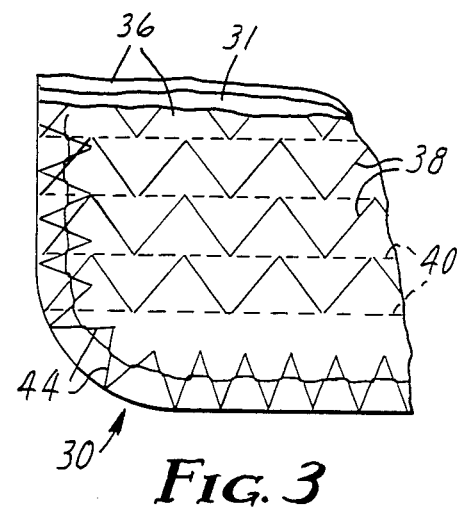

FIG. 3 illustrates an alternate third embodiment of a welding blanket according to the present invention generally designated by the reference numeral 30. Like the welding blankets 10 and 20 of FIGS. 1 and 2 respectively, the welding blanket 30 comprises a layer of flexible protective material 31 having opposite major surfaces and comprising unexpanded vermiculite and inorganic heat resistant fibrous material, which layer 31 undergoes localized expansion in a direction normal to its major surfaces when contacted by spatter of molten metal during a welding process; and two relatively thin flexible cover sheets 36, one attached along each of the major surfaces of the layer of flexible protective material. Unlike the welding blanket 10, however, the cover sheets 36 are attached to the layer of flexible protective material 31 by a stitch bonding process that provide stitches through the cover sheets 36 and layer 31 of flexible protective material to hold them together with zig-zag portions 38 of the stitches on the outer surface of one cover sheet 36, and parallel rows of stitch portions 40 on the outer surface of the other cover sheet 36. Also, a conventional zig-zag pattern of stitches 44 has been used to bind together the aligned edges of the layer of flexible protective material 31 and cover sheets 36.

EXAMPLES

As a preferred non limiting embodiment of the welding blanket particularly adapted for use to protect surfaces of automobiles during wire welding, the layer of flexible protective material should contain about 58 percent of the unexpanded vermiculite, about 35 percent of inorganic heat resistant fiberglass fibrous material, and 7 percent of acrylic binder, and should be about 0.13 centimeter thick; and the cover sheets should be of flame resistant resin bonded nonwoven rayon (e.g., that sold under the trade designation APN 511 by The James River Corporation of Greenville, S.C.), and should be attached to the layer of flexible protective material by stitch bonding.

As a preferred non limiting embodiment of the welding blanket particularly adapted for use in the type of environment emulated by the U.S. Government test procedure described above, the layer of flexible protective material should contain about 58 percent of the unexpanded vermiculite, about 35 percent inorganic heat resistant ceramic fibrous material, and 7 percent acrylic binder, and should be about 0.3 centimeter thick; and the cover sheets should be of flame resistant resin bonded nonwoven rayon and attached to the layer of flexible protective material by stitch bonding.

The present invention has now been described with reference to three embodiments thereof. It will be apparent to those skilled in the art that many changes can be made in the embodiments described without departing from the scope of the present invention. Thus the scope of the present invention should not be limited to the structures descried in this application, but only by structures described by the language of the claims and the equivalents of those structures.

We claim:

1. A welding blanket for protecting a surface from the spatter of molten metal during a welding process, said welding blanket comprising a layer of flexible protective material having opposite major surfaces and comprising unexpanded vermiculite and inorganic heat resistance fibrous material, which layer of flexible protective material undergoes localized expansion in a direction normal to said surfaces when contacted by spatter of molten metal during a welding process to restrict embedding of the spatter in the blanket so that the spatter globules will fall off or can be easily brushed off of the blanket; and two relatively thin flexible cover sheets, one attached along each of said major surfaces.

2. A welding blanket according to claim 1 wherein said cover sheets are of combustible material.

3. A welding blanket according to claim 1 wherein said layer of flexible protective material contains in the range of 30 to 85 percent by weight of the unexpanded vermiculite.

4. A welding blanket according to claim 1 wherein said layer of flexible protective material is over about 0.1 centimeter thick.

5. A welding blanket according to claim 1 wherein said cover sheets are attached to said layer of flexible protective material by an adhesive.

6. A welding blanket for protecting a surface from the spatter of molten metal during a welding process, said welding blanket comprising a layer of flexible protective material having opposite major surfaces and comprising unexpanded vermiculite and inorganic heat resistant fibrous material, which layer of flexible protective material undergoes localized expansion in a direction normal to said surfaces when contacted by spatter of molten metal during a welding process to restrict embedding of the spatter in the blanket so that the spatter globules will fall off or can be easily brushed off of the blanket; and two relatively thin flexible cover sheets, one attached along each of said major surfaces, said cover sheets being attached to said layer of flexible protective material by a stitch bonding.

7. A welding blanket for protecting a surface from the spatter of molten metal during a welding process, said welding blanket comprising a layer of flexible protective material having opposite major surfaces and comprising unexpanded vermiculite and inorganic heat resistant fibrous material, which layer of flexible protective material undergoes localized expansion in a direction normal to said surfaces when contacted by spatter of molten metal during a welding process to restrict embedding of the spatter in the blanket so that the spatter globules will fall off or can be easily brushed off of the blanket; and two relatively thin flexible cover sheets, one attached along each of said major surfaces, said cover sheets being attached to said layer of flexible protective material by sewing.

* * * * *